US006016351A

United States Patent [19]

Raida et al.

[11] Patent Number: 6,016,351

[45] Date of Patent: Jan. 18, 2000

[54] DIRECTED RADIATOR WITH MODULATED ULTRASONIC SOUND

[75] Inventors: Hans-Joachim Raida, Cologne; Oskar Bschorr, Munich, both of Germany

[73] Assignee: American Technology Corporation, Poway, Calif.

[21] Appl. No.: 08/895,486

[22] Filed: Jul. 16, 1997

[30] Foreign Application Priority Data

Jul. 16, 1996 [DE] Germany .......................... 196 28 849

[51] Int. Cl.[7] ...................................................... H04B 3/00

[52] U.S. Cl. ............................................................... 381/77

[58] Field of Search ......................................... 381/77, 79

[56] References Cited

U.S. PATENT DOCUMENTS

| | | |
|---|---|---|
| 4,265,122 | 5/1981 | Cook et al. . |
| 4,418,404 | 11/1983 | Gordon et al. . |
| 4,432,079 | 2/1984 | Mackelburg et al. . |
| 5,539,705 | 7/1996 | Akerman et al. . |

*Primary Examiner*—Vivian Chang

*Attorney, Agent, or Firm*—Thorpe, North & Western

[57] ABSTRACT

An ultrasonic beam (19) is used as a virtual array for an acoustic directional transmitter (11,21,31,41,51, and 61). The acoustic useful signal is modulated upon the ultrasonic beam as carrier via amplitude modulation, for example. The absorption of the ultrasonic power produces thermal expansion of the air and thus acoustic monopole radiation. At the same time, radiation pressure is released, resulting in dipole radiation. The superimposition of monopole and dipole produces a marked directivity characteristic. Since the ultrasonic sound possesses the same propagation velocity as the useful sound, the monopole and dipole radiation takes place within the virtual array correctly in terms of transit time, resulting in radiation that is directed extremely in the propagation direction. The effective array length can be adjusted over a wide range using the absorption coefficient that is a function of the carrier-frequency and, in extreme cases, a very punctual acoustic radiation can be realized at a wide distance. These types of directional transmitters are suitable as anti-sound generators and for directional signal and sound transmission. The ultrasonic carriers can be realized via piezoelectric (12) or pneumatic ultrasonic transmitters (22,32,42,52, and 62).

34 Claims, 2 Drawing Sheets

DIRECTED RADIATOR WITH MODULATED ULTRASONIC SOUND

BACKGROUND OF THE INVENTION

The subject of the Invention is a sound generator that generates directional low-frequency useful sound via a modulated ultrasonic beam. On the other hand, conventional sound generators (such as loudspeakers, sirens, air-modulated devices, etc.) essentially function as monopole sources. As a rule, loudspeakers require a large-volume housing for acoustically effective radiation with low frequencies. Directional radiation at medium and low frequencies is only possible using a cumbersome array set-up of several monopole sources with expensive, frequency-dependent control of the individual monopole sources being required, however. The object of the invention at hand is creating a sound generator having small dimensions that operates along an adjustable virtual array having any length and thereby making extremely directed useable sound radiation possible. In accordance with the invention, the ultrasonic generator emits an ultrasonic cone having carrier frequency Ω which is also modulated with modulation frequency ω, with Ω being greater than ω. The beam angle of the ultrasonic cone is assumed to be small in the following, so that the transverse dimensions of the cone within the effective range of the ultrasonic sound are small a compared with the wavelengths to be radiated. During propagation, ultrasonic power $N_o$ emitted by the ultrasonic generator diminishes exponentially as a result of absorption. The sound power modulated harmonically with frequency ω along the ultrasonic beam is as follows, taking the transit-induced retardation into consideration:

$$N(x,t)=\frac{N_o}{2}(1-\sin(\omega(t-x/c)))e^{-\alpha x}$$

with:

N(x,t): Sound power along the ultrasonic cone $N_o$(t): Sound power emitted by directional transmitter x: Path coordinate in propagation direction t: Time c: Velocity of sound x/c: Transit time-induced retardation αAbsorption coefficient with carrier frequency Ω

Ultrasonic power can be modulated in various ways. Thus, the ultrasonic amplitude of the carrier signal can be modulated. Depending upon the degree of modulation, undesired ambient noise can occur, which can be prevented using known measures (such as predistortion, etc.). Another possibility is frequency modulation, for example via two ultrasonic generators oscillating at different frequencies. The ultrasonic power can also be modulated by modulating carrier frequency Ω and, thus, the absorption coefficient α. In doing this, it must be taken into consideration that the absorption coefficient does not depend linearly on the carrier frequency. The modulation can also be carried out by influencing the ultrasonic sound reactively or resistively, for example by using resonators and/or absorbers. The variation types of modulation can be combined. The absorbed ultrasonic power along distance dx is as follows:

$$\frac{dN_{\mathrm{Abs}}(x,t)}{dx}=\alpha\frac{N_o}{2}(1-\sin(\omega(t-x/c)))e^{-\alpha}$$

The absorbed ultrasonic power $dN_{Abs}$(x,t) produces local warming and a volume change of the ambient medium (monopole radiation) as well as radiation pressure which exerts a force on the ambient medium (dipole radiation). The source strength of the monopole dQ(x, t) and the force dF(x,t) of the dipole are as follows:

$$dQ(x,t)=\frac{K-1}{\kappa}\frac{dN_{\mathrm{Abs}}(x,t)}{p_o}\quad dF(x,t)=\frac{dN_{\mathrm{Abs}}(x,t)}{c}$$

with:

K: Adiabatic exponent of the ambient medium $p_o$: Ambient pressure

The useful sound pressure components of the monopole and dipole sources superpose producing an amplification in the direction of the ultrasonic propagation. In the opposite direction weakening of the useful sound radiation occurs. In the case of an ultrasonic cone, referred to as "ultrasonic beam" in the following, this acts like a long virtual array of individual monopole and dipole sources due to the absorption which is only gradual. Characteristic array length L and half-life distance $L_{0.5}$, (within which up to one half of the ultrasonic power is absorbed are determined by the absorption coefficient α.

$$L=\frac{1}{\alpha}\quad L_{0.5}=\frac{\ln(2)}{\alpha}$$

The absorption coefficient is α=0.03 to 1 $m^{-1}$ for ultrasonic frequencies Ω=10 to 200 kHz, which corresponds to a characteristic array length adjustable from L=33 to 1 m. Owing to the transit time of the ultrasonic beam, the areas of the array radiate to each other in a time-displaced manner, producing strongly directional useful sound radiation in the propagation direction of the ultrasonic beam ("end fired line" Olson, Elements of Acoustical Engineering, Nostrand Company, Mc. Princeton, 1957). Overtones can be used in a concerted manner in order to increase absorption and thereby reduce characteristic array length L. The possibility of using broad band ultrasonic sound as a carrier also exists in addition to a single or several carrier frequencies. The resulting useful sound pressure at a test point in a free field (far field approximation) follows for an effective array length l:

$$p(r,\theta,\omega,t)=\int_{\dot{Q}(0)}^{\dot{Q}(1)}\frac{\varrho\, dQ(t-x/c-(r-x\cos\theta)/c}{4\pi r}+\int_{\dot{F}(0)}^{\dot{F}(1)}\frac{dF(t-x/c-(r-x\cos\theta/c)}{4\pi rc}\cos(\theta$$

with:

σ: Equals density of air r: Distance from the directional transmitter to the test point θ: Angle between test point and ultrasonic beam Useful sound pressure p is retarded, on the one hand, by time x/c (transit time of the ultrasonic sound from emission point x=0 to radiation location x) as well as by time (r−x cos θ)c (transit time from radiation location to test point). The following formulas are given in general for the asymptotic case 1→∞. The following is produced for the useful sound pressure (far field approximation) with absorbed sound power $dN_{abs}(x,t)$:

$$\hat{p}(r,\theta,\omega)=\frac{N_o\omega(\kappa(1+\cos\theta)-1)}{8\pi\kappa rc^2\sqrt{1+\left(\frac{\omega}{\alpha c}(1-\cos\theta)\right)^2}}$$

The directivity characteristic R follows:

$$R(\theta,\omega)=\frac{\kappa(1+\cos\theta)-1}{2\kappa-1}-\frac{1}{\sqrt{1+\left(\frac{\omega}{\alpha c}(1-\cos\theta)\right)^2}}$$

A useful sound frequency-dependent carrier frequency Ω makes it possible for the ratio of the characteristic array length L to the useful sound wave length λ and thus the useful sound directivity characteristic R to be the same with all frequencies. In contrast to the case of a free field, with tube installation, the useful sound pressure amplitude in the emission direction of the ultrasonic cone is independent on angular frequency ω. In calculating the free-field characteristic it was presumed that the ultrasonic sound propagates along a beam. This model is sufficient as long as the cone width of the beam is small as compared with the wave length of the released useful sound. In the case of larger cone widths, an additional directional effect occurs due to the sectional perpendicular planes that are vibrating almost in-phase to the propagation direction. This directional effect is all the greater, the greater the local ratio of the ultrasonic cone width to the modulation wave length becomes. This directional effect is amplified if several parallel offset ultrasonic generators are used. The forward/reverse ratio of the useful sound is as follows:

$$\frac{\hat{p}(\theta=0^\circ,\omega)}{\hat{p}(\theta=180^\circ,\omega)}=(2\kappa-1)\sqrt{1+\left(2\frac{\omega}{\alpha c}\right)^2}$$

An additional monopole source can be used for influencing the directivity coefficient. The additional monopole can also be realized directly at the emission location by partial absorption of the ultrasonic sound. Another possibility consists of influencing the reverse dipole radiation using structural measures, such as encapsulation. Owing to the short ultrasonic wave lengths, this can be accomplished using small-volume measures. If the directional transmitter is installed in a tube, the resulting useful sound pressure (one-dimensional wave propagation being presumed) is calculated as follows:

$$p(\vec{r},\omega)=\frac{\left(\kappa-1+\kappa\,sign(\vec{xt})\right)N_o}{4\kappa Sc}\,\frac{\left(\frac{\omega}{\alpha c}\right)\cos(\omega t)\left(1-sign(\vec{xt})\right)-\sin(\omega t)}{1+\left(\frac{\omega}{\alpha c}\right)^2\left(1-sign(\vec{xt})\right)^2}$$

Due to the fact that the directional transmitter does not function as a point source, rather it radiates along a virtual array, depending upon the absorption coefficient or carrier frequency, bundling of the wave propagation (one, two, three-dimensional sound field) etc., the useful sound pressure level in a free field does not drop proportionally 1/r in the proximity of the ultrasonic source as is the case with conventional sound generators. On the other hand, the useful sound pressure amplitude can possess any desired course in the propagation direction. It can drop, be held constant over a certain distance, or increase or possess a maximum in a certain distance. In the case of one-dimensional wave propagation (a tube for example), the useful sound pressure amplitude increases with the distance to the emission point. Piezoelectric sound generators are used in order to generate high ultrasonic power, these sound generators are coupled to resonators to increase the radiated power (air ultrasonic vibrator). In addition to the ultrasonic generators that are known per se, pneumatic ultrasonic generators such as the Galton whistle, Hartmann generator, Boucher whistle, vortex whistles, Pohlmann whistles and ultrasonic sirens for generating ultrasonic power are particularly suited. The subject of the invention is explained in more detail on the basis of the embodiments.

BRIEF DESCRIPTION OF THE DRAWINGS

The above and other objects, features and advantages of the invention will become apparent from a consideration of the following detailed description presented in connection with the accompanying drawings in which.

The following designations are applicable to all figures (the respective figure number shall be inserted for x):

| | |
|---|---|
| x 1 Directional transmitter | x 4 Rotor |
| x 2 Ultrasonic generator | x 5 Stator |
| x 3 Modulation unit | x 6 Actuation |

Additional designations with higher numbers (x7, x8 refer to the details of the individual drawings.

DETAILED DESCRIPTION

Figure 1:
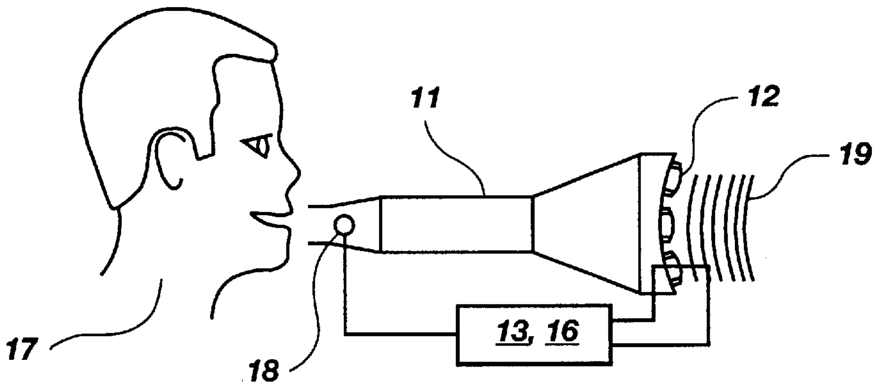
FIG. 1 directional transmitter with piezoelectric elements, modulation via voltage control.

Reference will now be made to the drawings in which the various elements of the present invention will be given numeral designations and in which the invention will be discussed so as to enable one skilled in the art to make and use the invention. Referring to FIG. 1, there is shown a directional transmitter 11 is depicted as a megaphone. Ultrasonic generation takes place via piezoelectric elements 12. The actuation 16 of the piezoelements is comprised of a power supply which is used simultaneously as a modulation unit 13. The voice signal of the speaker 17 to be emitted is fed by a series-connected microphone 18 of the modulation unit 13.

Figure 2:
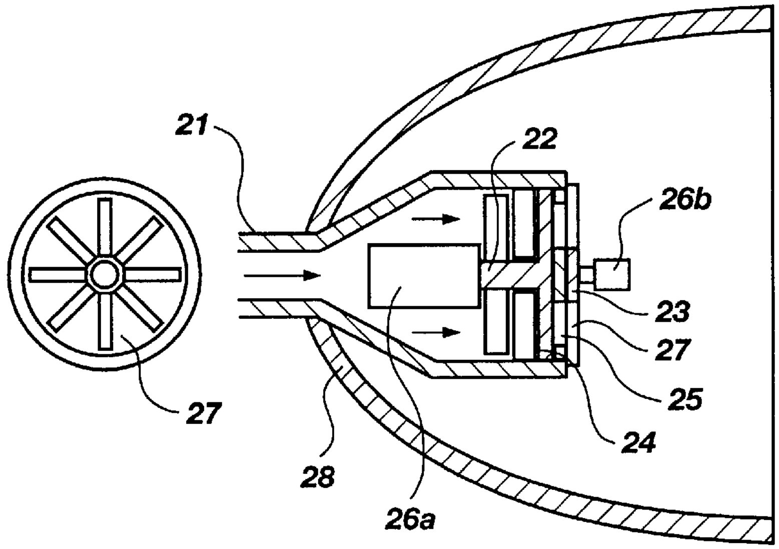
FIG. 2 represents a directional transmitter with ultrasonic siren, axial-flow compressor, apertured-disk modulation and parabolic reflector.

Referring now to FIG. 2, the pneumatically operating directional transmitter 21 is comprised in this case of an ultrasonic siren combined with an axial-flow compressor or axial blower as an ultrasonic generator 22. The axial-flow compressor is driven by an actuator 26*a*, which rotates a rotor 24 along with a running wheel. The rotor 24 and the stator 25 modulate the exiting volume flow with carrier frequency Ω. There is an apertured disk 27 that is driven by a second actuator 26*b* as modulation unit 23, which provides low-frequency modulation of the exiting volume flow. The parabolic reflector 28 bundles the ultrasonic sound.

Figure 3:
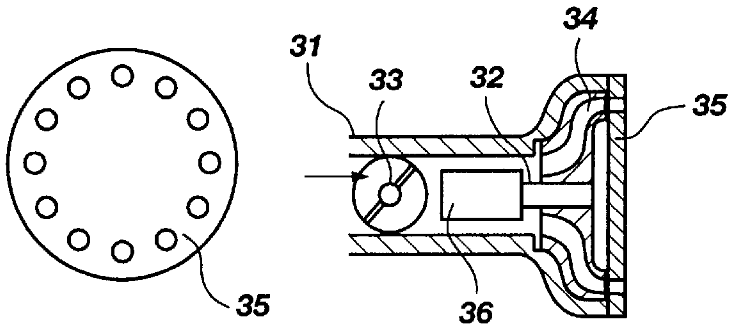
FIG. 3 depicts a directional transmitter with ultrasonic siren, centrifugal compressor and choke modulation.

Referring now to FIG. 3, the pneumatically operating directional transmitter 31 is comprised in this case of an ultrasonic siren combined with a centrifugal compressor or blower as an ultrasonic generator 32. The centrifugal compressor is comprised of a rotor 34 and an actuator 36. In order to modulate the exiting volume flow with carrier frequency Ω, the stator 35 is connected on the load side. A series-connected choke valve is used here as a modulation unit 33, which provides low-frequency modulation of the volume flow to the centrifugal compressor.

Figure 4:
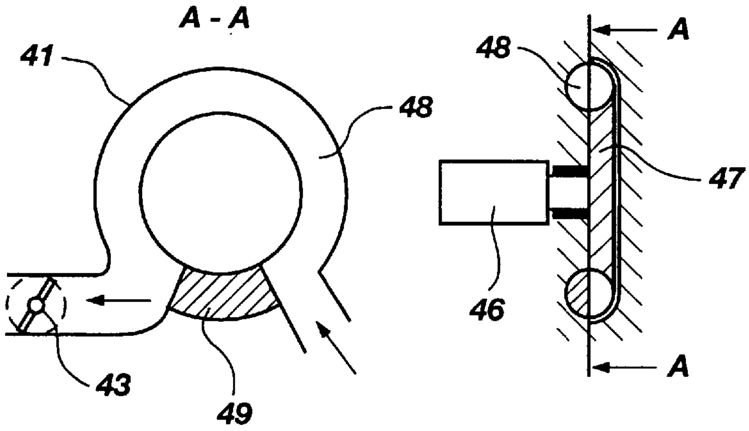
FIG. 4 shows a directional transmitter with side channel compressor and choke modulation.

Referring now to FIG. 4, the pneumatically operating directional transmitter 41 is comprised in this case of a side channel compressor. The side channel compressor is comprised of a running wheel 47 driven by actuator 46, which conveys the air into the side channel 48 in the direction of the arrow. In the side channel, the so-called interrupter 49 makes sure that no reflux takes place. Carrier frequency Ω is a function of the number of revolutions and the partitioning of the running wheel. The low-frequency amplitude modulation is realized by a choke valve 43 that is connected on the load side.

Figure 5:
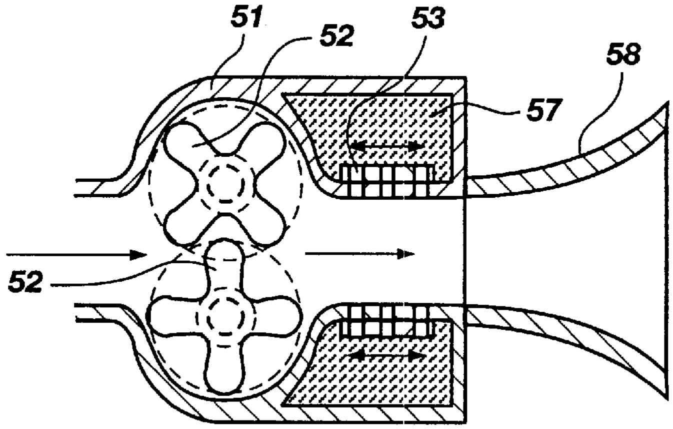
FIG. 5 depicts a directional transmitter with two rotating toothed gear, amplitude modulation via switchable absorber chambers, bundling of the ultrasonic sound via an exponential horn.

Referring now to FIG. 5, the directional transmitter 51 is comprised in this case of two quickly rotating toothed gears 52 which pulsatingly convey a volume flow with carrier frequency Ω. The openings to an absorber 57 are opened or closed by a slider 53 for low-frequency amplitude modulation of the volume flow. The emitted ultrasonic sound is bundled via the adjacent horn 58.

Figure 6:
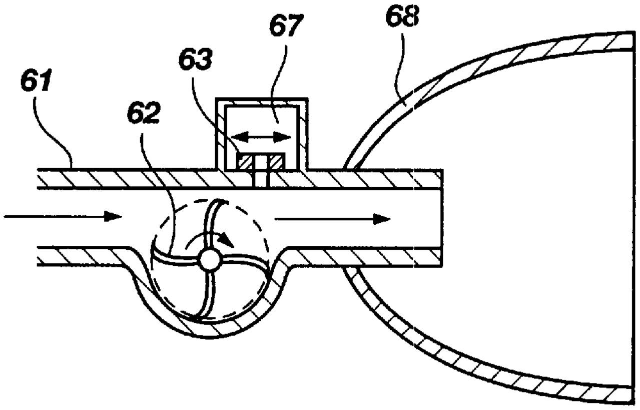
FIG. 6 shows a directional transmitter with one rotating toothed gear amplitude modulation via a Helmholtz resonator, bundling of the ultrasonic sound via a parabolic reflector.

Referring now to FIG. 6, the directional transmitter 61 is comprised in this case of a quickly rotating impeller wheel 62 which pulsatingly conveys a volume flow with carrier frequency Ω flow-dynamically. The opening to a Helmholtz resonator 67 is opened or closed by a slider 63 for amplitude modulation of the exiting volume flow. The emitted ultrasonic sound is bundled via the adjacent parabolic reflector 68.

What is claimed is:

1. A method for propagating audible sound from an ultrasonic emitter, comprising the steps of:

a) activating an ultrasonic pneumatic radiator for emitting ultrasonic sound as a carrier source for the audible sound to be propagated;

b) modulating the ultrasonic sound by controlled variation of absorption of ultrasonic power along the beam within air as a propagating medium to develop a virtual array of monopole and dipole radiating sources within the air operable within an audible frequency range; and c) propagating audible sound waves having a primary direction of propagation along the beam as a consequence of retarded absorption of the ultrasonic power along the beam and corresponding to at least one desired frequency within the audible frequency range.

2. A method as defined in claim 1, comprising the more specific step of modulating the at least one ultrasonic beam by modulating ultrasonic power absorption using at least one reactive or resistive member selected from the group consisting of resonators and absorbers during propagation along the beam to develop the desired audible time signal.

3. A method as defined in claim 2, comprising the more specific step of modulating the at least one ultrasonic beam by modulating the ultrasonic power absorption during propagation in accordance with selection of a plurality of frequency dependent absorption coefficients of the medium to develop the at least one desired frequency within the audible frequency range.

4. A method as defined in claim 3, including the step of selecting air as the propagating medium.

5. A method as defined in claim 4, comprising the more specific step of heating the air locally by absorption of ultrasonic power based on a selected frequency dependent absorption coefficient.

6. A method as defined in claim 5, wherein local absorption of ultrasonic energy generates (i) local expansion of the air which radiates as a local monopole audio source, and (ii) local radiation pressure which exerts a local force on the air causing local radiation as dipole audio source.

7. A method as defined in claim 6, comprising the further step of superimposing sound pressure from the respective local monopole and local dipole sources for directional amplification of sound along the ultrasonic beam.

8. A method as defined in claim 1, comprising the more specific step of modulating the at least one ultrasonic beam by amplitude modulation.

9. A method as defined in claim 1, comprising the more specific step of modulating the at least one ultrasonic beam by frequency modulation.

10. A method as defined in claim 1, comprising the more specific step of emitting a single ultrasonic beam as the carrier source without generating a second ultrasonic beam which could interfere to produce other forms of sonic output.

11. A method as defined in claim 1, comprising the more specific step of emitting a broad-band ultrasonic frequency beam.

12. A method as defined in claim 1, further comprising the step of emitting parallel beams of at least one ultrasonic frequency and processing each beam in accordance with the steps of claim 1.

13. A method as defined in claim 1, further comprising the step of emitting a separate monopole source in combination with the combined monopole and dipole sources being modulated by variation of absorption.

14. An apparatus as defined in claim 1, wherein the pneumatic radiator comprises both an interrupter unit and a compressor unit as part of a system for generating high power ultrasonic output.

15. A device for propagating directed audible sound from an ultrasonic emitter, comprising:

a) a pneumatic ultrasonic emitter for emitting at least one ultrasonic beam as a carrier source for the audible sound to be propagated;

b) modulating means coupled to the emitter for controlling variation of absorption of ultrasonic energy along the beam within a propagating medium to develop a virtual array of monopole and dipole radiating sources operable within an audible frequency range;

c) an audio signal source coupled to the modulating means for providing a desired audio signal; and d) power control means coupled to the modulating means for developing absorption of the ultrasonic power along the beam at different power levels corresponding to at least one desired frequency within the audible frequency range to propagate audible sound waves having a primary direction of propagation along the beam.

16. An apparatus as defined in claim 15, further comprising variable frequency selector means coupled to the modulating means for modulating the ultrasonic power absorption during propagation in accordance with selection of a plurality of frequency dependent absorption coefficients of the medium to develop the at least one desired frequency within the audible frequency range.

17. An apparatus as defined in claim 15, wherein the ultrasonic emitter includes means for propagating the ultrasonic frequency in air as the propagating medium.

18. An apparatus as defined in claim 15, comprising a plurality of emitter aligned in parallel relationship.

19. An apparatus as defined in claim 15, wherein the emitter comprises at least one piezoelectric transducer for emitting ultrasonic frequencies.

20. An apparatus as defined in claim 15, wherein the pneumatic ultrasonic emitter and modulating means comprise (i) a pneumatically operating directional transmitter for generating air flow, (ii) modulating structure coupled to the transmitter for modulating the air flow with an ultrasonic frequency, and (iii) a modulating unit coupled within the air flow and including means for providing the ultrasonically modulated air flow with low frequency modulation.

21. An apparatus as defined in claim 20 wherein the pneumatically operating directional transmitter comprises an axial flow compressor driven by a first actuator for generating ultrasonic frequency within the exiting air flow.

22. An apparatus as defined in claim 21, wherein the axial flow compressor includes a rotor coupled to the first actuator and a stator cooperatively positioned with respect to the rotor for modulating the exiting air flow with the ultrasonic frequency.

23. An apparatus as defined in claim 21, wherein the axial flow compressor comprises a centrifugal compressor.

24. An apparatus as defined in claim 23, wherein the flow compressor includes a rotor coupled to the first actuator and a stator cooperatively positioned with respect to the rotor for modulating the exiting air flow with the ultrasonic frequency.

25. An apparatus as defined in claim 20, said modulating means comprising an apertured disk driven by a second actuator disposed along the exiting air flow for providing low frequency modulation.

26. An apparatus as defined in claim 20, wherein the modulating unit comprises a series connected choke valve for applying low frequency modulation along the air flow.

27. An apparatus as defined in claim 20, wherein the pneumatically operating directional transmitter comprises a side channel compressor.

28. An apparatus as defined in claim 27, wherein the side channel compressor comprises a running wheel, an actuator coupled to the running wheel for applying power, and a side channel positioned adjacent the running wheel for air flow.

29. An apparatus as defined in claim 28, further comprising an interrupter element coupled along the side channel for preventing reflux.

30. An apparatus as defined in claim 20, wherein the directional transmitter comprises at least two rotating gears which at least partially intermesh for providing the ultrasonic frequency for the air flow.

31. An apparatus as defined in claim 30, wherein the (i) an absorber exposed to the air flow for modulation of the low frequencies in the air flow, and (ii) a slider positioned between the air flow and absorber and including openings variable between open and closed positions for low frequency amplitude modulation.

32. An apparatus as defined in claim 20, wherein the directional transmitter comprises at least one rotating impeller wheel which extends into the air flow and includes means for pulsatingly conveying ultrasonic frequency modulation.

33. An apparatus as defined in claim 20, wherein the modulating unit comprises a Helmholtz resonator including a movable slider positioned between the air flow and the Helmholtz resonator for modulating low frequencies into the air flow.

34. A device as defined in claim 15, for further comprising at least one reactive or resistive member selected from the group consisting of resonators and absorbers.

* * * * *